UNITED STATES PATENT OFFICE.

NATHAN SULZBERGER, OF NEW YORK, N. Y.

FUEL CONTAINING SPENT FULLERS' EARTH.

1,174,199.　　Specification of Letters Patent.　Patented Mar. 7, 1916.

No Drawing.　Application filed November 16, 1915. Serial No. 61,826.

*To all whom it may concern:*

Be it known that I, NATHAN SULZBERGER, born in New York city, and a citizen of the United States, residing in New York city, in the county and State of New York, have invented new and useful Improvements in Fuel Containing Spent Fullers' Earth, of which the following is a specification.

When using small pieces of combustible heat producing material, in particular of small particles of coal, coal dust of flue-gases, it is for many purposes desirable to make use of the same in the form of a solid mass of various shapes and weight. Thus, for instance, small particles of coal are pressed and formed together into solid pieces called briquets, etc. In order to form such product into a solid mass it is necessary to employ with the combustible matter a binding material. As such various substances have been used and proposed, as for instance, cement, molasses, tar, pitch, etc., which on account of their price, or for other reasons in connection with the manufacturing of, or with the finished product, have not been completely satisfactory.

I have found that spent fullers' earth, particularly such as has been used in deodorizing and clarifying fats and oils and containing various percentages of such fats and oils is well adapted to be used as a binding material, particularly when forming and coking together particles of coal. Since this product is known to be subject under conditions to spontaneous combustion, it is well seen that the same is a suitable addition to a heat-producing-material. The presence of the fatty material, which is absorbed by the fullers' earth as such is added in a powdered condition to the fat and oil which is to be treated, outside of the coking properties which the fullers' earth itself may possess, makes such spent fullers' earth an excellent binding material when mixed in with a finely divided coal. As an example about ten parts of spent fullers' earth may be added to a powdered coal, being well mixed with the same, and the product then heated and pressed into desirable shape. Fullers' earth containing carbon added to increase the deodorizing action may also be used.

In cases the spent fullers' earth may be used for fuel purposes after its fatty contents have been saponified. Such product is protected under my United States Patent No. 968092 covering "Process for utilizing spent fullers' earth" patented August 23rd, 1910.

Mixtures with other substances shall also come under the scope of this invention, and all modifications of the product, as will suggest themselves to those skilled in the art.

Claims:

1. A fuel containing spent fullers' earth.
2. A fuel containing spent fullers' earth which has been used in treating material of a fatty origin.
3. A heat producing product comprising spent fullers' earth and coal.
4. A heat producing product in solid form, comprising coal and spent fullers' earth which has been used in treating material of a fatty origin.
5. A briquet comprising finely divided coal and spent fullers' earth.
6. A heat producing material in form of a shaped solid comprising divided coal and spent fullers' earth which has been used in treating material of a fatty origin.
7. A heat producing material in form of a shaped solid comprising coal in mixture with about ten per cent. of spent fullers' earth.
8. A heat producing material in form of a shaped solid comprising coal in mixture with about ten per cent. of spent fullers' earth which has been used in treating material of a fatty origin.

New York city, November 15, 1915.

NATHAN SULZBERGER.

Witnesses:
　LEWIS JACKSON,
　JAS. A. HOWARD.